(12) United States Patent
Yang et al.

(10) Patent No.: US 12,196,990 B2
(45) Date of Patent: Jan. 14, 2025

(54) COLOR FILTER STRUCTURE, RELATED PHOTOGRAPHING METHOD, DEVICE, TERMINAL, AND STORAGE MEDIUM

(71) Applicant: BEIJING XIAOMI MOBILE SOFTWARE CO., LTD., Beijing (CN)

(72) Inventors: Zongbao Yang, Beijing (CN); Yan Zheng, Beijing (CN); Hui Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 710 days.

(21) Appl. No.: 17/329,815

(22) Filed: May 25, 2021

(65) Prior Publication Data

US 2022/0137275 A1 May 5, 2022

(30) Foreign Application Priority Data

Nov. 2, 2020 (CN) .......................... 202011202136.2

(51) Int. Cl.
*G02B 5/28* (2006.01)
*G02B 5/20* (2006.01)
*H04N 23/11* (2023.01)
*H04N 25/13* (2023.01)

(52) U.S. Cl.
CPC ............ *G02B 5/286* (2013.01); *G02B 5/201* (2013.01); *H04N 23/11* (2023.01); *H04N 25/135* (2023.01)

(58) Field of Classification Search
CPC ............ H01L 27/14621; H04N 25/131; H04N 25/133; H04N 25/135; H04N 23/11; H04N 25/40; H04N 2209/047; H04N 23/55; H04N 23/64; H04N 23/80; G02B 5/286; G02B 5/201; G02B 5/20
See application file for complete search history.

(56) References Cited

U.S. PATENT DOCUMENTS

| | | | | |
|---|---|---|---|---|
| 6,759,646 B1 * | 7/2004 | Acharya | ............... | H04N 25/134 250/226 |
| 6,816,193 B1 * | 11/2004 | Kohashi | ................. | H04N 9/646 348/E5.064 |
| 7,375,803 B1 * | 5/2008 | Bamji | ................ | G02B 27/1013 356/4.01 |
| 8,854,514 B1 * | 10/2014 | Lee | ................... | H01L 27/14621 348/278 |

(Continued)

FOREIGN PATENT DOCUMENTS

| | | |
|---|---|---|
| JP | 2004228662 A | 8/2004 |
| WO | WO 2011113162 A1 | 9/2011 |
| WO | WO 2019151029 A1 | 8/2019 |

OTHER PUBLICATIONS

European Patent Application No. 21176604.3 extended Search and Opinion dated Nov. 8, 2021, 8 pages.

(Continued)

*Primary Examiner* — Chiawei Chen
(74) *Attorney, Agent, or Firm* — Cozen O'Connor

(57) ABSTRACT

A color filter structure includes multiple color filter groups. Each color filter group includes multiple color filters. For each color filter group, the multiple color filters transmit light of preset wavelength bands, and each color filter corresponding to a respective preset wavelength band. At least two of the preset wavelength bands correspond to a common color channel.

18 Claims, 7 Drawing Sheets

(56) References Cited

U.S. PATENT DOCUMENTS

| | | | | |
|---|---|---|---|---|
| 9,425,227 | B1* | 8/2016 | Wang | H01L 27/14621 |
| 9,494,768 | B2* | 11/2016 | Komiya | A61B 5/1032 |
| 9,517,002 | B2* | 12/2016 | Matsuzawa | H04N 23/12 |
| 11,778,288 | B2* | 10/2023 | Harter | A61B 5/0035 |
| | | | | 348/71 |
| 2010/0238329 | A1* | 9/2010 | Suzuki | H04N 23/88 |
| | | | | 348/254 |
| 2015/0077617 | A1* | 3/2015 | Komiya | A61B 5/1032 |
| | | | | 348/336 |
| 2015/0288950 | A1* | 10/2015 | Zhang | H04N 25/135 |
| | | | | 348/47 |
| 2017/0264811 | A1* | 9/2017 | Ollila | H04N 23/672 |
| 2020/0083269 | A1* | 3/2020 | Ozawa | H01L 27/14623 |
| 2021/0037173 | A1* | 2/2021 | Uemori | A61B 1/00 |
| 2021/0192685 | A1* | 6/2021 | Nomura | G06T 5/50 |
| 2022/0003906 | A1* | 1/2022 | Kim | G02B 5/22 |
| 2022/0094861 | A1* | 3/2022 | Gruev | A61B 1/000096 |
| 2022/0132079 | A1* | 4/2022 | Choi | H04N 25/135 |
| 2022/0198604 | A1* | 6/2022 | Dabral | H01L 27/14649 |

OTHER PUBLICATIONS

Shrestha, R. et al. "Spatial Arrangement of Color Filter Array for Multispectral Image Acquisition"; Sensors, Cameras, and Systems for Industrial, Scientific, and Consumer Applications XII, SPIE, vol. 7875; Feb. 2011; 10 pages.

* cited by examiner

COLOR FILTER STRUCTURE, RELATED PHOTOGRAPHING METHOD, DEVICE, TERMINAL, AND STORAGE MEDIUM

CROSS REFERENCE TO RELATED APPLICATIONS

This application claims priority and benefits to Chinese Application No. 202011202136.2, filed on Nov. 2, 2020, the entire content of which is incorporated herein by reference.

BACKGROUND

The existing image sensors of mobile phones and other terminals can generate a single image every time in a condition where a color channel of the same color corresponds to a certain wavelength band.

SUMMARY

The disclosure relates to a field of image processing technologies, and particularly to a color filter structure, a related photographing method, a device, a terminal, and a storage medium.

The disclosure provides a color filter structure. The color filter structure includes multiple color filter groups. Each color filter group includes multiple color filters. For each color filter group, the color filters transmit light of multiple preset wavelength bands, and each color filter corresponds to a respective preset wavelength band. At least two of the preset wavelength bands correspond to a common color channel.

The disclosure further provides an image sensor including a color filter structure. The color filter structure includes multiple color filter groups. Each color filter group includes multiple color filters. For each color filter group, the color filters transmit light of multiple preset wavelength bands, and each color filter corresponds to a respective preset wavelength band. At least two of the preset wavelength bands correspond to a common color channel.

The disclosure further provides a photographing method, applied to a terminal. The method includes: acquiring multiple sub-images, each sub-image corresponding to a respective one of preset wavelength bands, and at least two of the preset wavelength bands corresponding to a common color channel; and determining a photographing result based on the multiple sub-images.

The disclosure further provides a terminal. The terminal includes an image sensor having a color filter structure. The color filter structure includes multiple color filter groups. Each color filter group includes multiple color filters. For each color filter group, the color filters transmit light of multiple preset wavelength bands, and each color filter corresponds to a respective preset wavelength band. At least two of the preset wavelength bands correspond to a common color channel.

It is to be understood that the above general description and the following detailed description are only exemplary and explanatory and do not limit the disclosure.

BRIEF DESCRIPTION OF THE DRAWINGS

The drawings herein are incorporated into the specification and constitute a part of the specification, illustrating examples conforming to the disclosure, and used to explain the principle of the disclosure together with the specification.

Each of FIGS. 5-12 is a respective flowchart illustrating at least part of one or more photographing methods according to embodiments of the disclosure.

Figure 13:
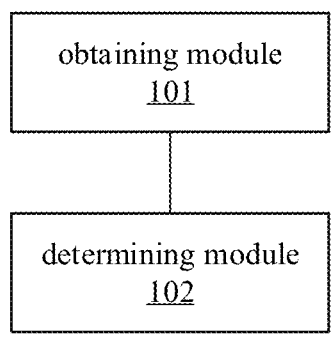

FIG. 13 is a block diagram illustrating a photographing device according to embodiments of the disclosure.

Figure 14:
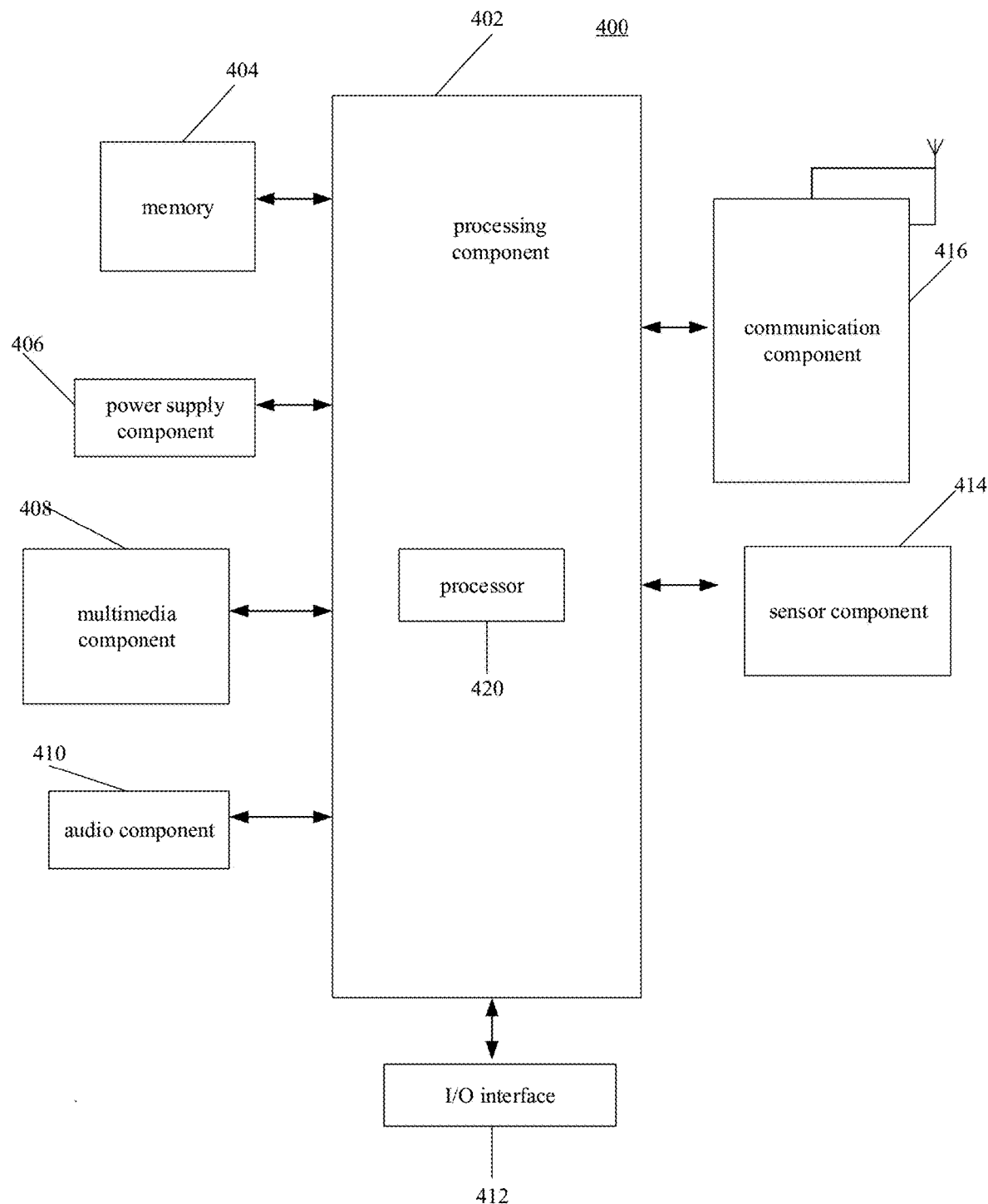

FIG. 14 is a block diagram illustrating a terminal according to embodiments of the disclosure.

DETAILED DESCRIPTION

The exemplary embodiments will be described in detail here, and examples are illustrated in the accompanying drawings. When the following description refers to the drawings, unless otherwise indicated, the same numbers in different drawings indicate the same or similar elements.

The implementation manners described in the following exemplary embodiments do not represent all implementation manners consistent with the disclosure. On the contrary, they are merely examples of devices and methods consistent with some aspects of the disclosure as detailed in the appended claims.

Figure 1:
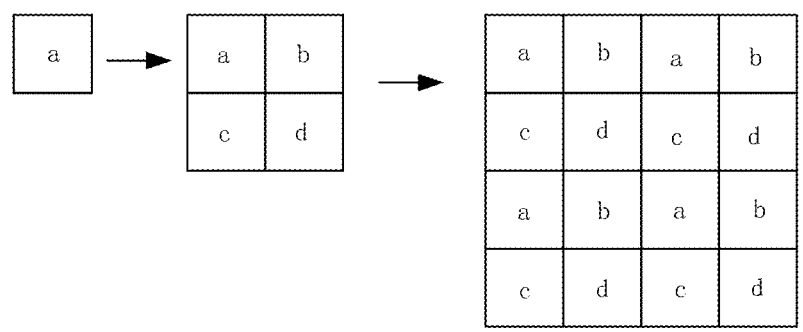
FIG. 1 is a schematic diagram illustrating a color filter structure in related arts.

In related arts, as illustrated in FIG. 1, in the image sensor, the pixel structure based on the Bayer array divides the natural light into light corresponding to RGB (red, green, blue) color channels (also referred to as optical channels), relying on the arrangement of color filters. Each color channel corresponds to a respective range of wavelengths within a certain electromagnetic wavelength band. In the color filter structure, each color filter group includes four color filter unit, and each filter unit include one color filter. That is, each color filter group includes four color filters, i.e., the color filter a, the color filter b, the color filter c, and the color filter d. For example, the color filter a may be a red color filter (also referred to as R color filter), the color filter b may be a green color filter (also referred to as G color filter), the color filter c may be a transparent color filter (also referred to as T color filter), and the color filter d may be a blue color filter (also referred to as B color filter). Thus, the color filter a corresponds to the R color channel, the color filter b corresponds to the G color channel, the color filter d corresponds to the B color channel, and the color filter c may transmit the visible light. With demosaicing algorithm and white balance algorithm processing, a color image can be obtained.

In FIG. 1, the color filter group includes the T color filter corresponding to the visible light and the RGB color filters that roughly divide the natural light into the wavelength bands corresponding to the light of the RGB color channels. However, the wavelength band of the light corresponding to each of RGB color channels is not subdivided. Thus, the color filter structure as illustrated in FIG. 1 cannot be used to obtain a sub-image corresponding to a narrower wavelength band, and thus cannot obtain detailed image information. As a result, this color filter structure cannot provide diversity of functions, which can only be used for conventional photographing, and the imaging effect is poor.

The existing image sensor can generate a single image every time in a condition where a color channel of the same color corresponds to a certain wavelength band, which significantly restricts the imaging effects and diversification of the imaging results. The existing image sensor can only meet daily photographing needs, but it is difficult to improve the imaging effects.

The disclosure provides a color filter structure of an image sensor different from FIG. 1. In the color filter structure of the disclosure, color filters corresponding to subdivided wavelength bands may be provided, and the wavelength band of the light passing through each color filter is narrower than that of the red light, the light green, and the blue light. Multiple more refined sub-images can be obtained. It is to be noted that each sub-image corresponds to a certain subdivided wavelength band. The sub-image will be described below with reference to FIG. 3. The sub-images may be processed based on requirements, to meet different needs and improve the user experience. In an example, a spectral characteristic curve of a photographed object can be generated based on the multiple sub-images, for object recognition. In another example, the photographed object may be highlighted directly during the photographing process, since the brightness of the photographed object is different from the brightness of other objects in the sub-images corresponding to different wavelength bands.

Figure 2:
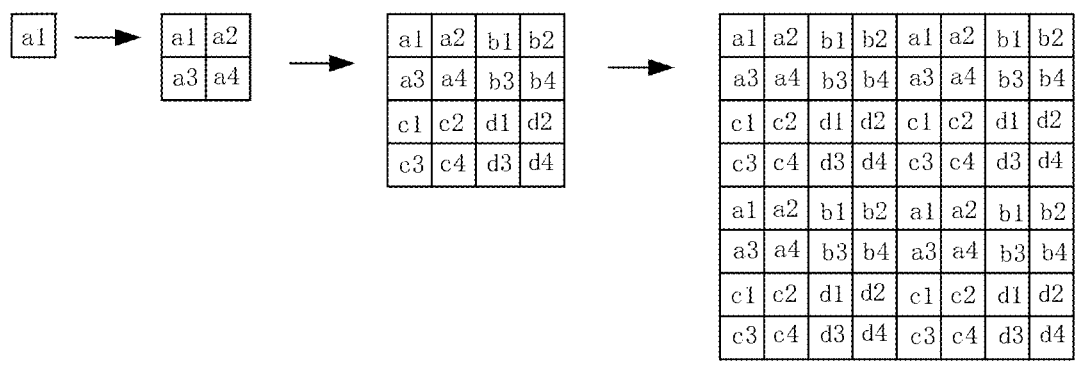
FIG. 2 is a schematic diagram illustrating a color filter structure according to embodiments of the disclosure.

The color filter structure of the disclosure is illustrated in FIG. 2. The color filter structure includes multiple identical color filter groups, and each color filter group includes multiple color filters. Each color filter covers a pixel element of the image sensor. The size of the pixel element ranges from 0.6 µm to 2.0 µm. In some examples, the size of the pixel element is 1.0 µm, for balancing the amount of passed light and the size of the image sensor.

In each color filter group, the multiple color filters are used to transmit light of preset wavelength bands respectively, and there is a one-to-one correspondence between the color filters and the preset wavelength bands. That is, each color filter corresponds to a respective preset wavelength band, the preset wavelength bands corresponding to the color filters are different from each other (or not overlapped to each other), and the number of the color filters is the same with the number of types of the preset wavelength bands. At least two of the preset wavelength bands may correspond to a common color channel. That is, at least two of the color filters correspond to the common color channel.

It is understandable that the above-mentioned common color channel may be a near infrared (NIR) color channel. In this case, some preset wavelength bands may be determined within an NIR wavelength band (i.e., the wavelength band of the NIR light). For example, at least two preset wavelength bands within the NIR wavelength band may be determined. In addition, the above-mentioned common color channel may be a visible light channel. In this case, some preset wavelength bands may be determined within a certain wavelength band (i.e., a wavelength band of the certain color light within the visible light). For example, at least two wavelength bands within the certain wavelength band may be determined. Richer image information can be obtained, a variety of photographing functions can be realized, and diversified photographing results can be obtained based on requirements. The user requirements may be well satisfied, and the user experience may be improved.

In the existing solution, the light of wavelength band within a color channel (e.g., a blue channel) is used to generate only one sub-image every time, and only the rough information of the blue light reflected by an object can be obtained. In the color filter structure of the disclosure, the light of the wavelength band within a color channel is used to generate for example two sub-images every time. If the blue channel corresponds to two preset wavelength bands, two sub-images can be obtained respectively with the light of the two preset wavelength bands corresponding to the B color channel, and image information of the two sub-images corresponding to the two subdivided wavelength bands can be obtained. Multiple sub-images may be obtained for the blue channel, richer image information may be determined to facilitate the image analysis and realize more functions. For example, when a photographing result is an image-type result, more types of images can be obtained, and images with higher effects can be obtained.

It is understandable that the more preset wavelength bands corresponding to a color channel, the more sub-images can be obtained and the more detailed image information can be obtained. More image processing functions may be realized and the photographing result of higher quality can be obtained. For example, when a photographing result is an image, the image with a better image effect can be obtained. Correspondingly, with more color channels each corresponding to multiple wavelength bands, more detailed image information can be obtained, more image processing functions can be realized, and the photographing result of higher quality can be acquired. That is, the narrower the wavelength range corresponding to a certain wavelength band, the more detailed the image information is obtained, the more the image processing functions is realized, and the higher quality the photographing result is obtained.

In the color filter structure as illustrated in FIG. 2, each color filter group includes multiple color filter units for transmitting the light of preset wavelength bands. Each color filter unit includes multiple color filters. At least one color channel corresponds to multiple color filters of the color filter group.

The above-mentioned multiple color channels may be selected from a group of an NIR color channel, a R color channel, a G color channel, and a B color channel. For example, the multiple color channels may be the NIR color channel, the R color channel, the G color channel, and the B color channel. In addition, some of the multiple color channels may be one of the above color channels, and the remaining color channels may be a color channel for transmitting the light of other colors, such as a purple color channel used to transmit the purple light, to meet different needs. In some examples, the color channel can be a far-infrared color channel for transmitting the far-infrared light, for more complex spectral analysis.

In the color filter structure, multiple color channels are provided, and at least one of the multiple color channels corresponds to multiple color filters. The term "multiple" means more than one. When an image sensor provided with the color filter structure is working, sub-images corresponding to the multiple color channels can be obtained, where each color channel corresponds to multiple sub-images. Compared with the related arts, richer image information may be obtained and more photographing functions may be realized.

There are two types of the color filter group as follows.

First type: in each color filter group, all color filters of at least one color filter unit are used to transmit the light of a common color channel.

That is, in a color filter group, there may be one color filter unit arranged in a such way that all color filters contained in the color filter unit can be used to transmit the light of the common color channel. In addition, in a color filter group, there may be two or more color filter units arranged in a such way that all color filters contained in each color filter unit can be used to transmit the light of the common color channel corresponding to the color filter unit. Furthermore, in a color filter group, all color filter units can be arranged in a such way that all color filters in each color filter unit are used to transmit the light of the common color channel corresponding to the color filter unit. In other words, the color filter units correspond to the multiple color channels one by one.

As illustrated in FIG. 2, all color filters in each color filter unit are used to transmit the light of the common color channel corresponding to a respective color filter unit.

The color channels corresponding to the color filter units of the filter unit group includes the NIR color channel for transmitting the NIR light, the B color channel for transmitting the blue light, the R color channel for transmitting the red light, and the G color channel for transmitting the green light. Each color filter group includes four color filter units for transmitting the light of the above-mentioned NIR color channel, the B color channel, the R color channel, and the G color channel respectively. That is, the four color filter units are used to respectively transmit the NIR light, the blue light, the red light, and the green light. Each color filter unit includes four color filters. In the color filter unit for transmitting the NIR light, all four color filters are used to transmit the NIR light. In the color filter unit for transmitting the blue light, all four color filters are used to transmit the blue light. In the color filter unit for transmitting the red light, all four color filters are used to transmit the red light. In the color filter unit for transmitting the green light, all four color filters are used to transmit the green light.

In this way, each color channel corresponds to four preset wavelength bands, and four sub-images can be acquired for each color channel. Compared with the related arts that only one image can be acquired for each color channel, richer and more accurate image information can be obtained by the color filter structure of the disclosure, for significantly improving the photographing effect. In addition, because richer image information is obtained, more functions can be realized and more photographing results can be obtained. For example, in the disclosure, because there are 16 preset wavelength bands, 16 sub-images corresponding to the 16 preset wavelength bands can be obtained. The spectral characteristic curve may be determined based on the 16 sub-images, and an object type or the composition of an object can be determined based on the spectral characteristic curve. That is, the object type or the composition of the object can be obtained with the color filter structure of the disclosure.

Second type: the multiple color filters in each color filter unit correspond to at least two color channels.

That is, some color filters in each color filter unit may correspond to a color channel, and remaining color filters may correspond to another color channel. In addition, each color filter in each color filter unit may correspond to a different color channel. In a condition that each color filter corresponds to a different color channel, the number of color channels corresponding to each color filter group may be the same with or different from the number of color channels corresponding to the color filters in each filter unit.

In an example of the color filter structure, each color filter in each color filter unit may correspond to a different color channel, and the number of the color channels corresponding to each color filter group is the same as the number of color channels corresponding to multiple color filters in each color filter unit.

Each color filter group may correspond to four color channels, i.e., the NIR color channel, the B color channel, the R color channel, and the G color channel. Each color filter group includes four color filter units, and each color filter unit corresponds to the above four color channels. Each color filter unit includes four filters, and the four color filter in each color filter unit respectively correspond to the above four color channels.

For example, each color filter group includes 16 color filters, denoted as a1, a2, a3, a4, b1, b2, b3, b4, c1, c2, c3, c4, d1, d2, d3, and d4. The color filters a1, a2, a3, and a4 correspond to the R color channel, the color filters b1, b2, b3, and b4 correspond to the G color channel, the color filters c1, c2, c3, and c4 correspond to the NIR color channel, and the color filters d1, d2, d3, and d4 correspond to the B color channel. A first color filter unit may include the color filters a1, b1, c1, and d1, a second color filter unit may include the color filters a2, b2, c2, and d2, a third color filter unit may include the color filters a3, b3, c3, and d3, and a fourth color filter unit may include the color filters a4, b4, c4, and d4.

The color filter structure including multiple color filter groups may have two structures as follows.

First structure (not illustrated in figures): each color filter group includes multiple color filter units, and each color filter unit includes a single color filter. Multiple color filters in each color filter group are used to transmit the light of preset wavelength bands that are linearly distributed. Each color filter corresponds to a respective preset wavelength band.

In this structure, each color filter in the color filter group is used to transmit the light of one preset wavelength band, and the multiple preset wavelength bands corresponding to multiple color filters are linearly distributed, to generate sub-images corresponding to the linearly distributed wavelength bands. The multiple sub-images may be processed to meet different user requirements.

Second Structure: each color filter group includes multiple color filter units for transmitting the light of multiple color channels. Each color filter unit includes multiple color filters, and the multiple color filters in the color filter unit are used to transmit the light of the preset wavelength bands. Each color filter corresponds to a respective preset wavelength band. For each color filter group, the multiple preset wavelength bands corresponding to a common color channel are linearly distributed.

There are two manners of the second structure.

First manner: as illustrated in FIG. 2, each color filter unit in a color filter group is used to transmit the light of a respective color channel. In other words, the number of color filter units in a color filter group is the same as the number of color channels, and each color filter unit corresponds to a respective color channel.

For example, as illustrated in FIG. 2, the color channels corresponding to each color filter group may include the NIR color channel, the R color channel, the G color channel, and the B color channel. Thus, each color filter group may include four color filter units respectively corresponding to the four color channels. The preset wavelength bands corresponding to the multiple color filters in each color filter unit are all within the wavelength band of the color channel. In addition, the multiple preset wavelength bands corresponding to the multiple color filters in each color filter unit are linearly distributed, such that the color filter structure can obtain more refined sub-images.

Second manner (not illustrated in figures): each color filter group includes multiple color filter units. Each color filter unit is used to transmit the light of multiple color channels. Each color filter unit includes multiple color filters. The multiple color filters in each color filter unit are used to transmit the light of multiple preset wavelength bands respectively. Each color filter corresponds to a respective preset wavelength band. The preset wavelength bands corresponding to a common color channel are linearly distributed. That is, types of the color channels corresponding to the color filter group are the same as types of the color channels corresponding to the color filter unit, and the number of color filters in each color filter unit is the same with the number of the types of the color channels corresponding to each color filter group.

For example, the color channels corresponding to each color filter group includes the NIR color channel, the R color channel, the G color channel, and the B color channel. Thus, each color filter unit may also correspond to the NIR color channel, the R color channel, the G color channel, and the B color channel. Each color filter unit includes four color filters respectively corresponding to the four color channels. In addition, in terms of the common color channel, preset wavelength bands corresponding to color filters contained in each color filter group are linearly distributed, such that the color filter structure can obtain more refined sub-images.

It is to be noted that the above-mentioned linear distribution of preset wavelength bands refers to that within a certain wavelength range, the length of each preset wavelength band is the same. For example, every 10 nm, 20 nm, or 30 nm of a certain wavelength range is determined as a preset wavelength band.

For example, every 10 nm of a wavelength range from 350 nm to 510 nm may be determined as a preset wavelength band to obtain totally 16 wavelength bands, i.e., 350 nm-360 nm, 360 nm-370 nm, 370 nm-380 nm, . . . , 480 nm-490 nm, 490 nm-500 nm, and 500 nm-510 nm. Each wavelength band may include both, a smaller one, a larger one, or none of two end values of the wavelength range.

In this color filter structure, narrower wavelength bands are provided, i.e., the wavelength band of the light passing through each color filter is narrower to obtain refined sub-images. By processing the multiple sub-images based on requirements, different requirements may be met and the user experience may be enhanced. For example, the spectral characteristic curve of the photographed object can be generated from the multiple sub-images for object recognition. In addition, the photographed object may be directly cut out during the photographing process, since the brightness of different objects is different in the sub-images corresponding to different wavelength bands.

As illustrated in FIG. 2, in the color filter structure, the multiple color filters in each color filter unit are arranged in an N×N array, where N is an integer greater than or equal to 2; and/or, the multiple color filter units in each color filter group are arranged in an M×M array, where M is an integer greater than or equal to 2.

In this color filter structure, each color filter unit includes at least 4 color filters, and each color filter group includes at least 16 color filters. While capturing an image using the image sensor provided with this color filter structure, each image pixel at least corresponds to the sub-images of 16 preset wavelength bands. Compared with the existing image sensor that the R color channel, the light of the G color channel, and the light of the B color channel are used to generate three sub-images, the color filter structure of the disclosure may obtain more sub-images, and the imaging of the photographed object is achieved in multiple wavelength bands, such that the photographed object may be analyzed well. In addition, accurate and more diversified image processing may be performed on the sub-images corresponding to the 16 preset wavelength bands to meet different user requirements.

It is to be noted that the wavelength range corresponding to the color filter group is generally from 0.3 μm to 1 μm, or from 8 μm to 14 μm. For different wavelength ranges, the image sensor may be formed by different materials, for example the silicon germanium, the vanadium oxide, or the gallium arsenide.

As illustrated in FIG. 2, each color filter group corresponds to four color channels, namely the NIR color channel, the R color channel, the G color channel, and the B color channel. Each color filter group includes four color filter units arranged in a 2×2 array, and each color filter unit is used to transmit the light of a respective color channel. Each color filter unit includes four color filters arranged in a 2×2 array. All of the four color filters in a common color filter unit are used to transmit the light of the same color channel.

In other words, each color filter group includes 16 color filters. Each color filter has the same size to ensure that a light transmission area is the same for each preset wavelength band. As illustrated in FIG. 2, the color filters are marked as a1, a2, a3, a4, b1, b2, b3, b4, c1, c2, c3, c4, d1, d2, d3, and d4. The color filters a1, a2, a3, and a4 correspond to the R color channel, the color filters b1, b2, b3, and b4 correspond to the G color channel, the color filters c1, c2, c3, and c4 correspond to the NIR color channel, and the color filters d1, d2, d3, and d4 correspond to the B color channel. The preset wavelength band corresponding to the color filter a1 may be 600 nm±10 nm, the preset wavelength band corresponding to the color filter a2 may be 630 nm±10 nm, the preset wavelength band corresponding to the color filter a3 may be 660 nm±10 nm, the preset wavelength band corresponding to the color filter a4 may be 690 nm±10 nm, the preset wavelength band corresponding to the color filter c1 may be 800 nm±10 nm, the preset wavelength band corresponding to the color filter c2 may be 850 nm±10 nm, the preset wavelength band corresponding to the color filter c3 may be 900 nm±10 nm, the preset wavelength band corresponding to the color filter c4 may be 950 nm±10 nm, the preset wavelength band corresponding to the color filter b1 may be 500 nm±10 nm, the preset wavelength band corresponding to the color filter b2 may be 530 nm±10 nm, the preset wavelength band corresponding to the color filter b3 may be 560 nm±10 nm, the preset wavelength band corresponding to the color filter b4 may be 590 nm±10 nm, the preset wavelength band corresponding to the color filter d1 may be 400 nm±10 nm, the preset wavelength band corresponding to the color filter d2 may be 430 nm±10 nm, the preset wavelength band corresponding to the color filter d3 may be 460 nm±10 nm, and the preset wavelength band corresponding to the color filter d4 may be 490 nm±10 nm. The light transmittance of the color filter structure may be illustrated in FIG. 3.

In each color filter group, multiple color filters corresponding to the common color channel are arranged together in the 2×2 array. When the image sensor is working, multiple sub-images corresponding to the common color channel are combined into an output image, to increase the amount of light corresponding to the color channel. In terms of each color filter group, a pixel element covered by a color filter corresponding to a preset wavelength band generates an image pixel of a sub-image corresponding to the preset wavelength band. It is also possible to perform an interpolation operation based on the sub-images corresponding to a color channel of multiple image pixels to obtain sub-images corresponding to other color channels through a mosaic algorithm, and perform fusion processing to achieve high-resolution output and improve performance of details.

Figure 4:
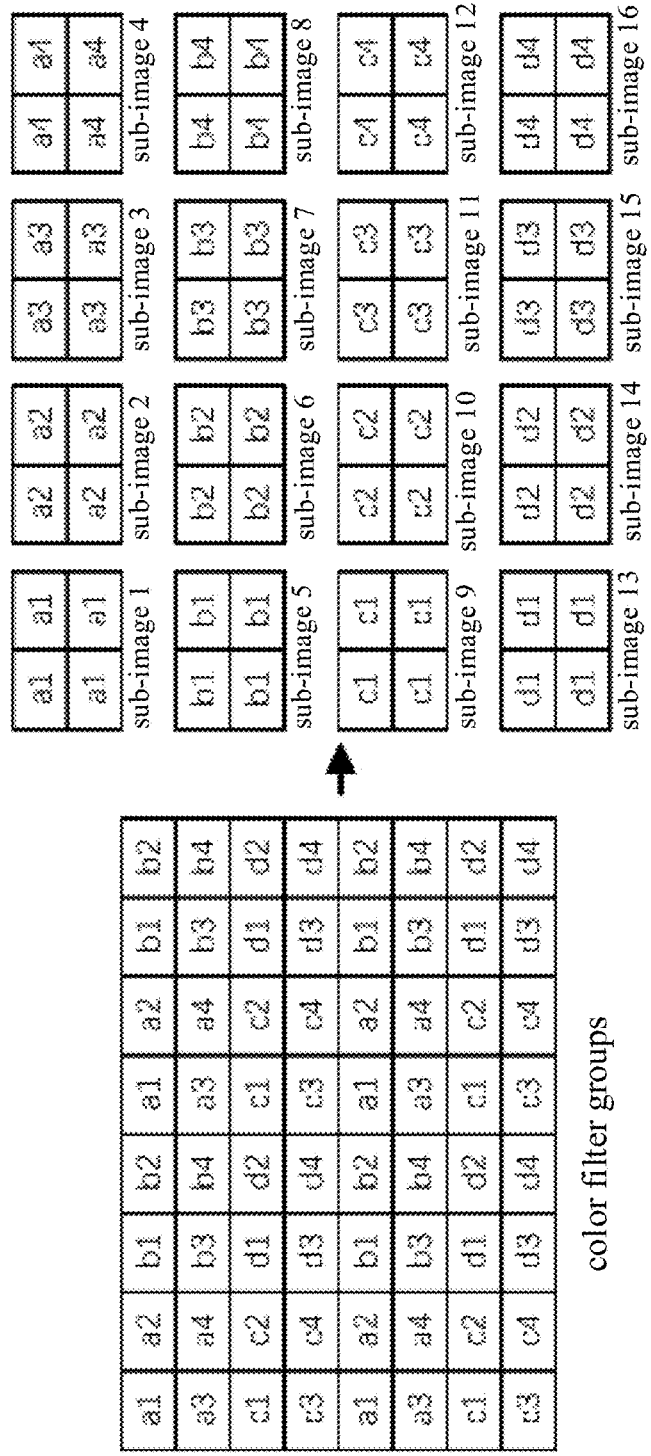
FIG. 4 is a schematic diagram illustrating parts of sub-images according to embodiments of the disclosure.

In some examples, the color filter structure may generate 16 sub-images. Each sub-image corresponds to a preset wavelength band. For example, for the R color channel, a sub-image may be generated based on only the color filter a1 of each color filter group in this color filter structure, a sub-image may be generated based on only the color filter a2 of each color filter group in this color filter structure, a sub-image may be generated based on only the color filter a3 of each color filter group in this color filter structure, a sub-image may be generated based on only the color filter a4 of each color filter group in this color filter structure. For other color channels, the sub-images may be generated in the same way. A part of each generated sub-image is illustrated in FIG. 4.

In the disclosure, the wavelength range of the light passing through the existing color filter is narrowed, that is, the preset wavelength band in the disclosure is narrower than the wavelength range corresponding to the existing color filter. In detail, the wavelength bands corresponding to the existing NIR color channel, the R color channel, the G color channel, and the B color channel are subdivided in a linear distribution way, to facilitate more refined and diversified photographing processing.

It is to be noted that the color filter structure of the disclosure can be used not only in the camera field, but also in other technical fields, such as petrochemicals, medicine and health, environmental protection, metallurgy, geological surveying, etc. If a field needs the collection of image information, the color filter structure of the disclosure can be applied.

In addition, the color filter structure subdivides the wavelength bands to a narrower range, such that the preset wavelength bands corresponding to each color filter are narrower. Based on the preset wavelength bands, mor detailed and accurate image information can be obtained, more functions can be realized and more photographing results can be obtained. That is, multiple color filters of the color filter structure may also be arranged in other patterns, as long as each color filter corresponds to a respective preset wavelength band, and at least two of the preset wavelength bands correspond to the common color channel.

The disclosure also provides an image sensor including the above-mentioned color filter structure, such that the image sensor has the same effect as the above-mentioned color filter structure.

The disclosure also provides a terminal. The terminal is, for example, a mobile phone, a video camera, a camera, a notebook computer, a tablet computer, and other devices with the photographing function. The terminal includes the above-mentioned image sensor, such that the terminal has a same effect as the above-mentioned image sensor, that is, the terminal has a same effect as the above-mentioned color filter structure.

Figure 3:
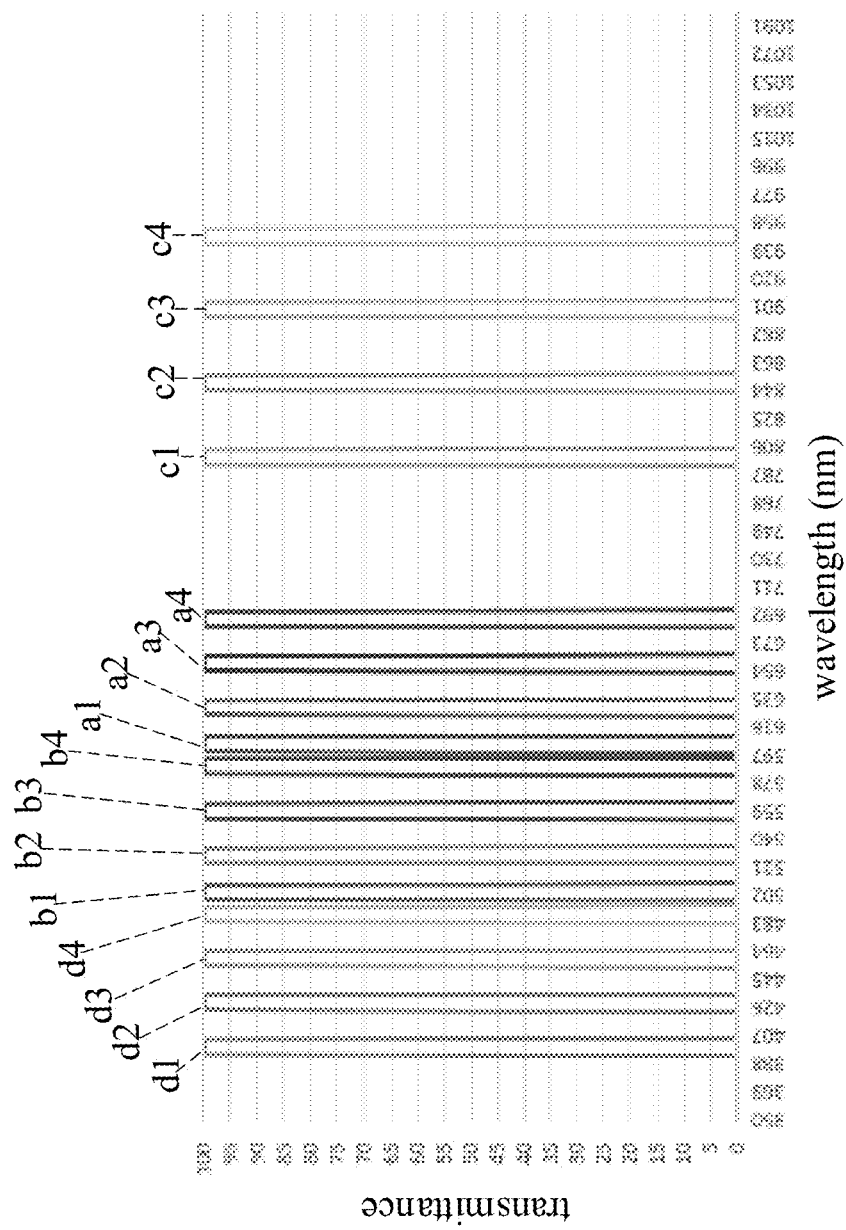
FIG. 3 is a schematic diagram illustrating the transmittance of a color filter structure according to embodiments of the disclosure.

For example, the terminal is a mobile phone. In the image sensor included in the mobile phone, as illustrated in FIGS. 2 and 3, the color filter group corresponds to four color channels, namely, the NIR color channel, the R color channel, the G color channel, and the B color channel. Each color filter group includes four color filter units arranged in a 2×2 array. Each color filter unit is used to transmit the light of a respective color channel. Each color filter unit includes four color filters arranged in a 2×2 array, and the four color filters in a color filter unit are used to transmit the light of a common color channel.

In other words, each color filter group includes 16 color filters, and each color filter has the same size to ensure that a light transmission area is the same for each preset wavelength band. As illustrated in FIG. 2, the color filters are marked as a1, a2, a3, a4, b1, b2, b3, b4, c1, c2, c3, c4, d1, d2, d3, and d4. The color filters a1, a2, a3, and a4 correspond to the R color channel, the color filters b1, b2, b3, and b4 correspond to the G color channel, the color filters c1, c2, c3, and c4 correspond to the NIR color channel, and the color filters d1, d2, d3, and d4 correspond to the B color channel. As illustrated in FIG. 3, the preset wavelength band corresponding to the color filter a1 may be 600 nm±10 nm, the preset wavelength band corresponding to the color filter a2 may be 630 nm±10 nm, the preset wavelength band corresponding to the color filter a3 may be 660 nm±10 nm, the preset wavelength band corresponding to the color filter a4 may be 690 nm±10 nm, the preset wavelength band corresponding to the color filter c1 may be 800 nm±10 nm, the preset wavelength band corresponding to the color filter c2 may be 850 nm±10 nm, the preset wavelength band corresponding to the color filter c3 may be 900 nm±10 nm, the preset wavelength band corresponding to the color filter c4 may be 950 nm±10 nm, the preset wavelength band corresponding to the color filter b1 may be 500 nm±10 nm, the preset wavelength band corresponding to the color filter b2 may be 530 nm±10 nm, the preset wavelength band corresponding to the color filter b3 may be 560 nm±10 nm, the preset wavelength band corresponding to the color filter b4 may be 590 nm±10 nm, the preset wavelength band corresponding to the color filter d1 may be 400 nm±10 nm, the preset wavelength band corresponding to the color filter d2 may be 430 nm±10 nm, the preset wavelength band corresponding to the color filter d3 may be 460 nm±10 nm, and the preset wavelength band corresponding to the color filter d4 may be 490 nm±10 nm.

When using this mobile phone for shooting, each pixel element receives reflected light of corresponding wavelengths from the photographed object and converts the reflected light into an electrical signal. Thus, the image information of the preset wavelength band corresponding to each pixel element is determined. The sub-image corresponding to a preset wavelength band is determined based on the image information of all pixel elements covered by the color filters corresponding to the same preset wavelength band. Through the flexible use of the sub-images corresponding to each preset wavelength band, the image or other photographing results required by the user are determined.

For example, the mobile phone can be used in the following scenarios.

First scenario: the mobile phone can be used to perform daily photographing functions.

In this scenario, the obtained multiple sub-images are directly fused to obtain a normal image. For example, the mobile phone can be used to shoot people, landscapes, buildings, artworks and so on. In an example, the normal image refers to that outputs of the pixels covered by a common filter color unit having the same color are binned as a pixel signal of the output image. In another example, the normal image refers to that an output of each pixel is separately used as a pixel signal of the output image. The methods for generating both the normal image can refer to existing demosaicing methods, which are not repeated here. In addition, principle of the shooting method in this scenario is the same as that of the existing shooting method, which is not repeated here.

Second scenario: the mobile phone can be used to realize the multi-spectral image capturing function. This scenario can be used for object recognition and composition determination.

The sub-images of different preset wavelength bands are determined. For example, when shooting an apple, the sub-images of different preset wavelength bands reflected by the surface of the apple may be determined, and spectral analysis is performed on a designated position of each sub-image to determine a spectral characteristic curve of the designated position. By comparing the obtained spectral characteristic curve with a prestored mapping table, the object type or the object compositions corresponding to the designated position may be determined. The prestored mapping table includes a mapping relationship between the spectral characteristic curves and the object types or a mapping relationship between the spectral characteristic curves and the object compositions.

In detail, the object recognition refers to that the object type is determined based on different intensities of the light of different wavelength bands reflected by the object surface and determined by the image sensor, where the intensity matches the inherent color characteristics of the object itself. For example, apples, pears, and oranges may be distinguished.

The composition determination refers to determining the composition of the object, such as the sugar content and the acidity of an apple, or determining the internal defects of the object, such as whether the apple is spoiled, based on the intensity of the reflected light of the object under different wavelength bands.

Third scenario: the mobile phone may be used to realize the image enhancement function.

Since more subdivided wavelength bands are provided for the color filter group, different image enhancement effects can be achieved through sub-images corresponding to different wavelength bands.

For example, at night, there is very little visible light. In this case, sub-images corresponding to wavelength bands near or at 850 nm or 940 nm (the wavelength band corresponding to the NIR color channel) are used for the image enhancement function. The sub-images may be fused with the sub-images corresponding to the visible light to realize the image enhancement of the night scene.

As another example, in the daytime, the sub-images corresponding to the wavelength bands of the red light (the wavelength bands corresponding to the R color channel) are used for the image enhancement function. The sub-images may be fused with the sub-images corresponding to the visible light to realize the image enhancement for a color channel and realize specific filter effect.

Fourth scenario: the mobile phone can be used to achieve the highlighting effect of a target object.

After the sub-images corresponding to the preset wavelength bands are determined, by comparing the sub-images, a contour image of the target object to be highlighted may be determined. The contour image may be fused with the multiple sub-images to highlight the target object, cut out the target object, and blur the background.

The absorption and the reflection of the light of different wavelengths may be different depending on object materials. An obvious difference (e.g., brightness differences) will occur at the junction of the objects formed by different materials in the obtained sub-images. The counter of the target object can be determined based on the above difference.

For example, while shooting a green plant in a flowerpot, the green plant may absorb green light and reflect light of other colors. The material of the flowerpot is different from that of the green plant. In the multiple sub-images corresponding to the wavelength band of the blue light obtained by mobile phones, the image information of green plant is poor compared with the image information of the flowerpot. The contour image of the green plant can be determined based on the low brightness values of the pixel points corresponding to the green plant in the B color channel to highlight the green plant or directly cut out the green plant, to achieve accurate image cutting effect.

In detail, for example three sub-images are acquired, namely, the first sub-image, the second sub-image, and the third sub-image. The first sub-image may be compared with the second sub-image to determine the contour information of the target object. Th contour information is matched with a fused image of the first sub-image, the second sub-image, and the third sub-image, to cut out the main body of the target object, to achieve a more accurate and faster image cutting effect.

Certainly, in actual use, more than three sub-images will be obtained, and more sub-images can determine more accurate contour information, to achieve more accurate image cutting effect.

Fifth scenario: the mobile phone may be used to flexibly extract an image of a certain wavelength band.

Based on the user requirements, the sub-images corresponding to a specified wavelength band may be directly selected among the acquired sub-images.

Sixth scenario: the mobile phone can be used to extract images of different resolutions.

Based on the user requirement on the image resolution, sub-images of different resolutions can be generated by selecting different numbers of pixels contained in the sub-images for generating the output image. In an example, for each sub-image, a first number of pixels can be selected from the sub-image to generate a first image, and the generated first images are fused into low-resolution image. In another example, for each sub-image, a second number of pixels can be selected from the sub-image to generate a second image, and the generated second images are fused into high-resolution image. The first number is less than the second number.

The terminal may not only perform ordinary photographing functions, but also provide richer functions, with low cost, high feasibility, and improved user experience.

Figure 5:
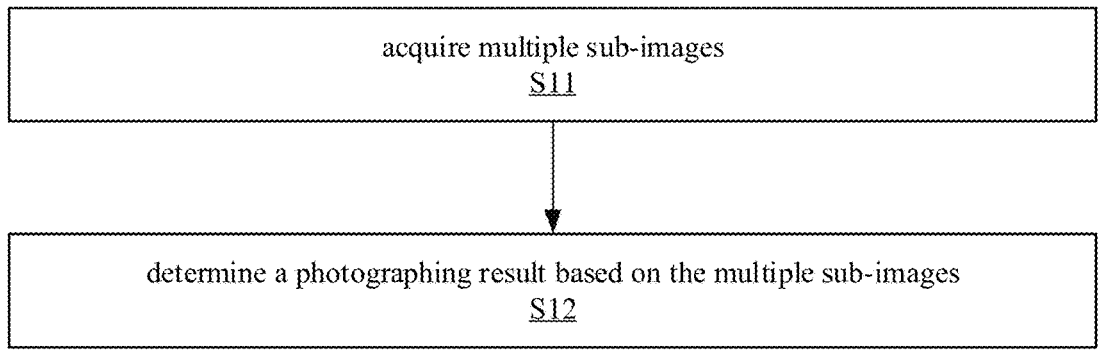

The disclosure also provides a photographing method, which is applied to the above-mentioned terminal. In detail, as illustrated in FIG. 5, the method may include the following.

At S11, multiple sub-images are obtained. Each sub-image corresponds to a preset wavelength band. At least two of the preset wavelength bands correspond to a common color channel.

At S12, a photographing result is determined based on the multiple sub-images.

In the block S11, image information generated by each pixel element corresponding to a respective preset wavelength band is determined, and the sub-image corresponding to the preset wavelength band is determined based on the image information of all pixel elements corresponding to the same preset wavelength band. In this way, the sub-images corresponding to all preset wavelength bands are obtained. Further, accurate sub-images corresponding to the linearly distributed wavelength bands may be obtained. With different processing methods, the corresponding characteristics of the photographed object can be determined, to better obtain the corresponding photographing result.

The multiple preset wavelength bands corresponding to the pixel elements are linearly distributed, such that the accurate sub-images corresponding to the linearly distributed wavelength bands can be obtained. With different processing methods, the corresponding characteristics of the photographed object are determined to better obtain the corresponding photographing results.

Each image pixel of an output image may correspond to multiple color channels. In the multiple preset wavelength bands corresponding to each image pixel, the preset wavelength bands corresponding to the common color channel are linearly distributed. Sub-images of a certain color channel can be acquired, and thus more detailed and accurate image information of the color channel can be determined. The corresponding characteristics of the photographed object can be determined through different processing methods to better obtain the corresponding photographed results.

In block S12, a corresponding setting mode can be determined based on different control instructions. That is, different control instructions correspond to different setting modes, to achieve different photographing results. A correspondence between the control instructions and the setting modes is preset in the terminal. For example, the setting mode corresponding to a highlighting control sub-instruction is used to highlight a target object corresponding to the highlighting control sub-instruction in an image. The setting mode corresponding to an enhancing control sub-instruction is used to perform image enhancement processing on a sub-image to be enhanced using an enhancement wavelength band.

The photographing result is not limited to the image-type results existing in the related arts. In this method, the photographing result includes at least one of: a base image of conventional photographing, a highlighted image with a highlighted object, an enhanced image with enhanced image information corresponding to a certain wavelength band, the type of the photographed object, the compositions of the photographed object, or the like.

For example, the base image refers to an image obtained by directly fusing the multiple sub-images without other processing.

In this photographing method, the subdivided wavelength bands are provided to obtain the more refined sub-images. The multiple sub-images may be processed based on requirements, to meet different needs and improve the user experience.

Figure 6:
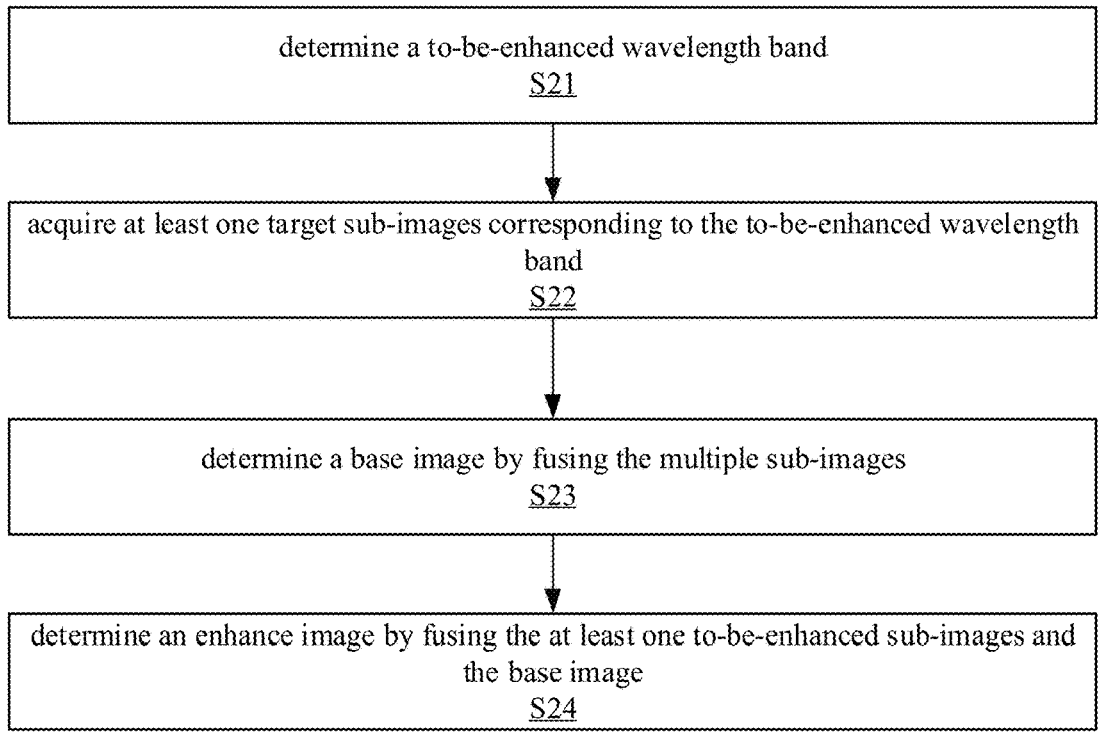

The disclosure further provides a photographing method, which is an improvement of the block S12 in the above method. As illustrated in FIG. 6, determining the photographing result based on multiple sub-images may include the following.

At S21, an enhancement wavelength band is determined.

At S22, at least one enhancement sub-image corresponding to the enhancement wavelength band is determined.

At S23, the multiple sub-images are fused to determine a base image.

At S24, the at least one enhancement sub-image is fused with the base image to determine an enhanced image. The enhanced image is the photographing result. The enhanced image refers to an image obtained by enhancing image information corresponding to the enhancement wavelength band of the base image.

In block S21, the enhancement wavelength band can be determined based on the selection of the user. For example, based on a second control instruction input by the user for determining the enhancement wavelength band, the corresponding enhancement wavelength band is determined. The enhancement wavelength band can also be determined based on current environmental information. For example, in a condition that the current environment is at night, in order to achieve the photographing effect of enhancing the night scene, the enhancement wavelength band may be automatically determined as the wavelength band of the visible light. The night scene enhancement is performed based on multiple sub-images corresponding to the preset wavelength bands in the visible light.

In some examples, the enhancement wavelength band is used for the image enhancement.

In an example, while performing the photographing in the night scene, the user wants to enhance the night scene. In this case, the user can select the function corresponding to the "night scene enhancement" on a photographing interface. The terminal may perform the night scene enhancement function based on the selection, and determine the enhancement wavelength band (e.g., the wavelength band of the IN light).

In another example, while performing the photographing in the night scene, the terminal may automatically recognize that the current photographing scene is the night scene based on a current time point, automatically start the night scene enhancement function, and determine the enhancement wavelength band (e.g., the wavelength band of the NIR light).

In block S22, after the enhancement wavelength band is determined, one or more preset wavelength bands corresponding to the enhancement wavelength band may be searched for from the multiple preset wavelength bands. Since the wavelength range of the preset wavelength band is narrow, there may be a case that the enhancement wavelength band includes two or more preset wavelength bands. If the enhancement wavelength band corresponds to only one preset wavelength band, only one enhancement sub-image may be acquired. If the enhancement wavelength band corresponds to multiple preset wavelength bands, multiple enhancement sub-images may be acquired. It is understandable that the narrower the wavelength range of the preset wavelength band, the larger the number of preset wavelength bands corresponding to the enhancement wavelength band, and the larger the number of enhancement sub-images, i.e., the richer the image information. More accurate and more effective image enhancement can be achieved.

In this method, the block S23 can also be performed simultaneously with the block S22, or before the block S22. Certainly, the block S23 can also be performed simultaneously with the block S21, or before the block S21. In the block S23, the method of the related arts may be used to fuse the multiple sub-images to determine the base image, which is not repeated here. It is to be noted that all the sub-images can be fused to obtain the base image, or only part of the sub-images can be fused to obtain the base image. The specific sub-images to be fused can be selected based on the user's requirements.

In block S24, the enhanced image is obtained by fusing the at least one enhancement sub-image and the multiple sub-images. The number of enhancement images to be fused may be determined based on the enhancement requirement. It is understandable that the higher the enhancement requirement, the greater the number of enhancement sub-images to be fused.

Certainly, if the terminal is provided with a normal photographing function, and a base image can be obtained by performing the normal photographing function every time, in the disclosure, the at least one enhancement sub-image can also be fused with the base image obtained by the normal photographing to determine the enhanced image. It can be understood that the base image can be determined based on some or all the multiple sub-images.

While performing the photographing in the night scene, since there is very little visible light, the sub-images corresponding to the preset wavelength bands near 850 nm or 940 nm (the wavelength band of the NIR light) may be determined as the enhancement sub-images, to realize the night scene enhancement effect.

For example, the sub-images corresponding to the wavelength band of the red light may be used as the enhancement sub-images, to achieve a single-channel enhancement effect, and achieve a specific filter effect.

In this method, different image enhancement effects can be achieved through the sub-images of different preset wavelength bands to meet different needs of users.

Figure 7:
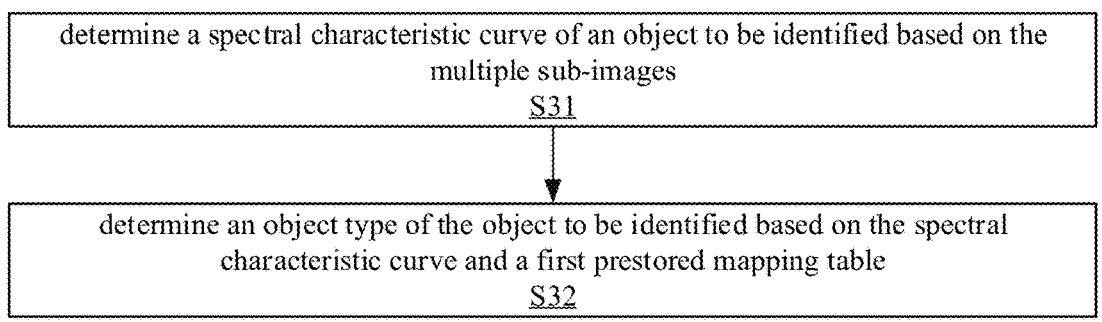

The disclosure further provides a photographing method, which is an improvement of the block S12 in the above method. As illustrated in FIG. 7, determining the photographing result based on the multiple sub-images may include the following.

At S31, a spectral characteristic curve of an object to be identified is determined based on the multiple sub-images.

At S32, an object type of the object to be identified is determined based on the spectral characteristic curve and a first prestored mapping table. The first prestored mapping table includes a correspondence between the spectral characteristic curves and the object types.

Intensities of the light of different wavelength bands reflected by different objects are different. Based on the above characteristic of the objects, the object type can be determined. For example, apples, pears, oranges may be distinguished.

In this method, the first prestored mapping table may be pre-stored in the terminal in advance. The first prestored mapping table includes the correspondence between the spectral characteristic curves and the object types. In the first prestored mapping table, the correspondence between the spectral characteristic curves and the object types can be determined based on multiple experiments. With the method, multiple sub-images of multiple preset wavelength bands can be determined for the object to be identified, and the spectral characteristic curve of the object to be identified is determined based on the multiple sub-images. By querying the first prestored mapping table based on the spectral characteristic curve, the object type of the object to be identified may be determined.

Figure 8:
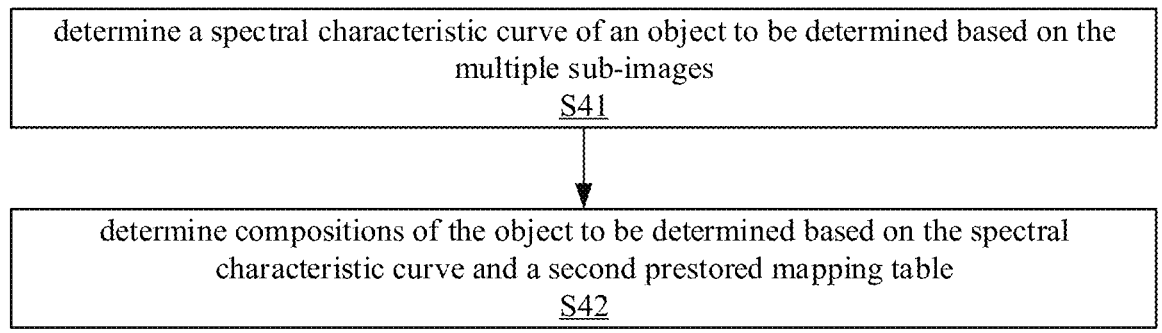

The disclosure further provides a photographing method, which is an improvement of the block S12 in the above method. As illustrated in FIG. 8, determining the photographing result based on the multiple sub-images may include the following.

At S41, a spectral characteristic curve of an object to be determined is determined based on the multiple sub-images.

At S42, the composition of the object to be determined is determined based on the spectral characteristic curve and a second prestored mapping table. The second prestored mapping table includes a correspondence between the spectral characteristic curves and the compositions.

Intensities of the light of different wavelength bands reflected by different components are different. Based on the above characteristic, the composition of the object can be determined. For example, the sugar content and acidity of an apple can be determined, or it may be determined whether an apple has spoiled.

In this method, the second prestored mapping table may be pre-stored in the terminal in advance. The second prestored mapping table includes the correspondence between the spectral characteristic curves and the components. In the second prestored mapping table, the correspondence between the spectral characteristic curves and the compositions can be determined through multiple experiments. This method can determine the sub-images corresponding to multiple preset wavelength bands for the object to be determined, and determine the spectral characteristic curve of the object to be determined based on the multiple sub-images. By querying the second prestored mapping table based on the spectral characteristic curve, the composition of the object to be determined may be determined.

Figure 9:
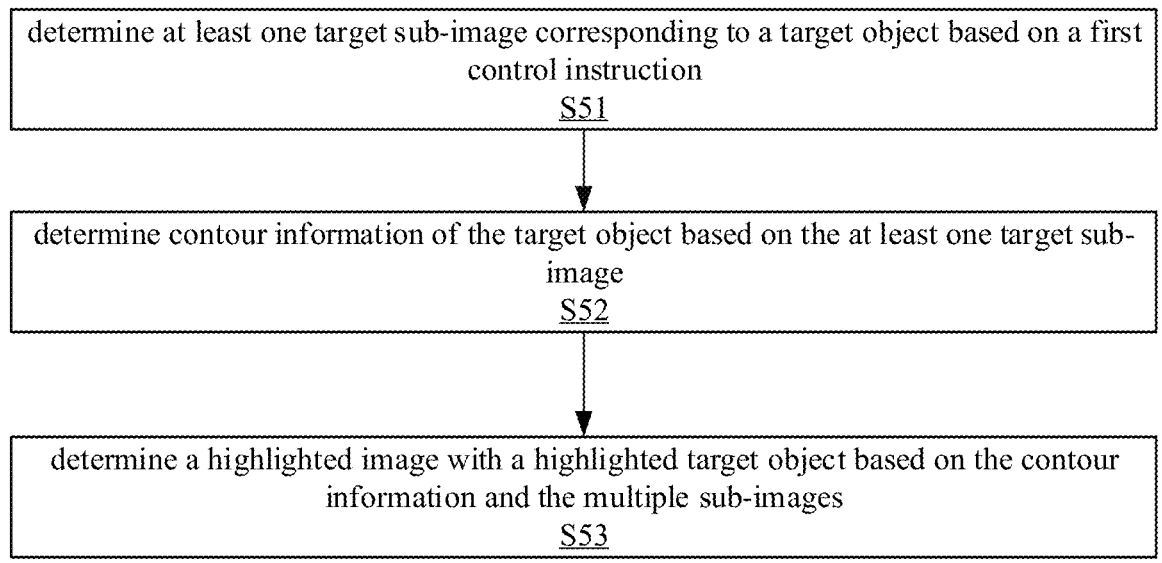

The disclosure further provides a photographing method, which is an improvement of the block S12 in the above method. As illustrated in FIG. 9, determining the photographing result based on the multiple sub-images may include the following.

At S51, at least one target sub-image corresponding to a target object is determined based on a first control instruction. The target sub-image refers to a sub-image used to determine contour information of the target object.

At S52, the contour information of the target object is determined based on at least one target sub-image. The contour information refers to information used to determine a contour of the target object.

At S53, a highlighted image with a highlighted target object is determined based on the contour information and the multiple sub-images. The highlighted image is the photographing result.

In block S51, the user can directly select at least one sub-image from the multiple sub-images, and determine the at least one selected sub-image as at least one target sub-image corresponding to the target object.

For example, the user can directly select a certain color channel, and thus the sub-images corresponding to the selected color channel are the at least one target sub-image.

For example, the user can directly select one or more preset wavelength bands, and thus one or more sub-image corresponding to the preset wavelength band(s) are the at least one target sub-image.

For example, the user can directly click one or more sub-images, and thus the clicked sub-image(s) is determined as the at least one target sub-image.

Certainly, the user can also input the first control instruction for determining the target object, such that the target object may be determined, and then the at least one target sub-image may be automatically determined through a preset algorithm.

While performing the photographing, a preview image is displayed on the terminal. Based on a position clicked by the user on the preview image, the target object corresponding to the position is determined. In addition, based on a touch trajectory input by the user, an object corresponding to an image enclosed by the touch trajectory is determined as the target object. It is understandable that the target object can also be determined through other methods of the related arts, which is not repeated here.

Figure 10:
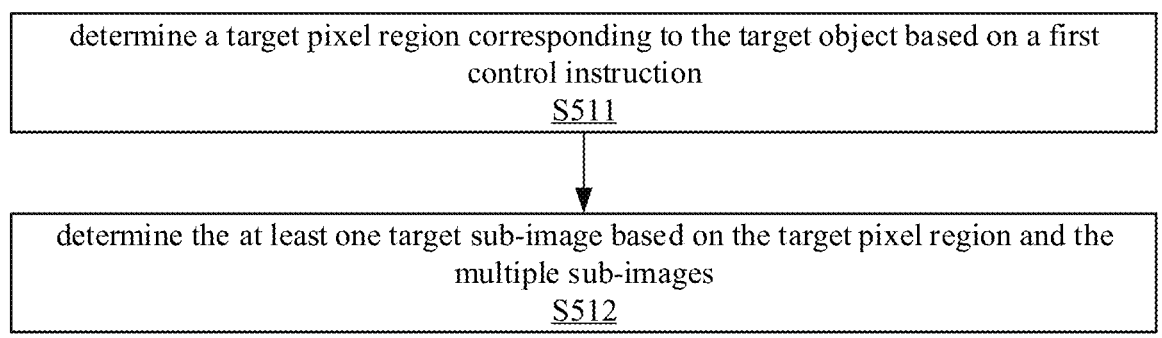

In detail, as illustrated in FIG. 10, determining the at least one target sub-image corresponding to the target object based on the first control instruction may include the following.

At S511, a target pixel region corresponding to the target object is determined based on the first control instruction.

At S512, the at least one target sub-image is determined based on the target pixel region and the multiple sub-images.

In block S511, each image includes multiple image pixels, and the target pixel region refers to a region where pixels used to display the target object in the sub-image are located. In each sub-image, the image information of the target pixel region is the image information of the target object in the sub-image, i.e., the image information of the target object in the sub-image corresponding to the preset wavelength band, or the brightness information of the light of the preset wavelength band reflected by the target object.

During the photographing, a preview image is displayed on the terminal. Based on the touch trajectory input by the user, the object corresponding to the image within the touch trajectory is determined as the target object. Pixel regions of all sub-images corresponding to the image enclosed by the touch trajectory form the target pixel region.

It is to be noted that the target pixel region of the target object in an image can also be determined by other existing technologies, which is not limited here.

In block S512, the target sub-image refers to a sub-image that the brightness information of a percent of pixels of the target pixel region of the sub-image is less than or equal to a brightness threshold. After the sub-image corresponding to each preset wavelength band and the corresponding target pixel region are determined, by comparing the brightness information of the target pixel region of each sub-image with the brightness threshold, at least one target sub-image can be determined for extracting the contour information of the target object. In this block, the value of the percent and the brightness threshold can be determined based on the requirement of the user, or automatically generated based on historical records, or set in advance.

For example, the determined target pixel region includes 10,000 pixels, the value of the percent is 80%, and the brightness threshold is 100 lux. If more than 8,000 pixels contained in the target pixel region of a certain sub-image have the brightness less than or equal to the 100 lux, the sub-image may be determined as a target sub-image. If only 7,000 pixels contained in the target pixel region of a certain sub-image have a brightness less than or equal to 100 lux, it may be determined that the sub-image is not a target sub-image.

In block S52, after the at least one target sub-image is determined, the contour information of the target object may be determined based on the brightness information of the at least one target sub-image. In detail, the brightness information of an image of the target object may be significantly different from the brightness information of the remaining part of the target sub-image. Based on the brightness difference, the contour information of the target object in the target sub-image can be determined. It is to be noted that the image of the target object refers to a part of the target sub-image where the target object is located. For example, the contour information may be coordinates of a contour trajectory. Based on the contour information, the image cutting effect or the highlighting effect of the target object can be achieved.

In block S53, determining the highlighted image with the highlighted target object based on the contour information and the multiple sub-images may include the following.

Figure 11:
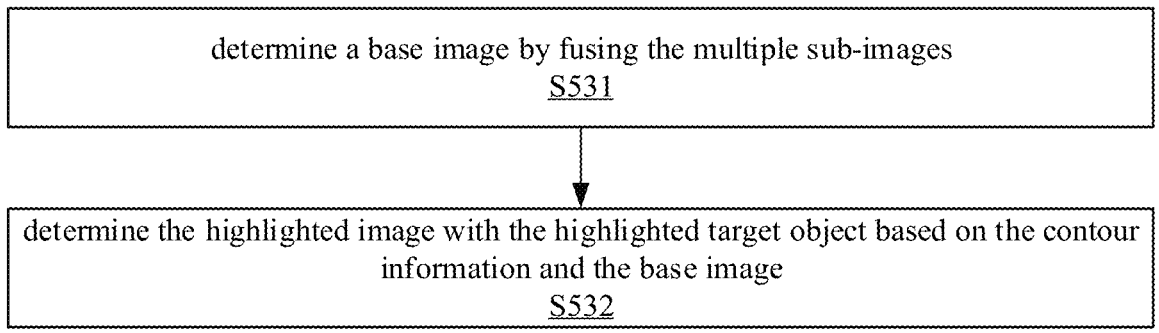

As illustrated in FIG. 11, a first manner for determining the highlighted image may include the following.

At S531, the multiple sub-images are fused to determine a base image of the multiple sub-images.

At S532, the highlighted image of the target object is determined based on the contour information and the base image.

In this method, the base image may be determined by performing the fusion processing on the acquired sub-images, and the highlighted image of the target object may be determined based on the contour information and the fused image. For example, the image cutting processing may be performed on the fused image based on the contour information, to determine the boundary between the image of the target object and remaining part of base image. By reducing the brightness value of the remaining part, the highlighted image in which the target object is highlighted is determined. When the brightness value of the remaining part is reduced to zero, only the image of the target object is displayed. In this method, the highlighted image is determined based on the contour information and the base image, and thus the operation is simple. For obtaining the highlighted image in which only the target object is highlighted with the method, only one image cutting operation is required, and thus the operation is simple and the image cutting operation is accurate.

It is to be noted that the above-mentioned base image is an image that is normally captured. In this method, the base image can be directly saved as a normal image for subsequent use.

Figure 12:
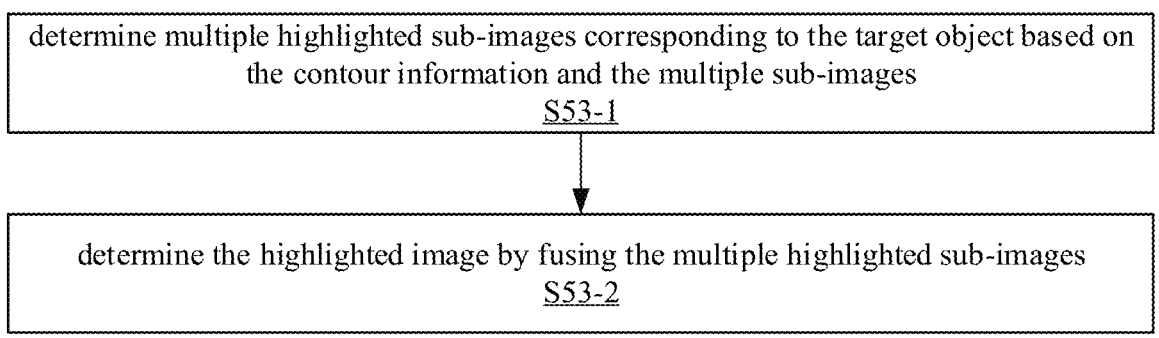

As illustrated in FIG. 12, a second manner for determining the highlighted image may include the following.

At S53-1, multiple highlighted sub-images corresponding to the target object are determined based on the contour information and the multiple sub-images.

At S53-2, the multiple highlighted sub-images are fused to determine the highlighted image with the highlighted target object.

In this manner, the highlighted sub-images correspond to the sub-images one by one. That is, one highlighted sub-image is generated based on one sub-image. This method may determine the multiple highlighted sub-images, and the multiple highlighted sub-images are all images having the highlighted target object. The multiple highlighted sub-images are fused to determine the highlighted image.

In some embodiments, the number of the multiple highlighted sub-images determined in this manner may be the same as the number of the multiple sub-images, and the difference between the highlighted sub-image and the sub-image is only that the target object is highlighted in the highlighted sub-image. The multiple sub-images may be replaced with the multiple highlighted sub-images for processing and obtaining the corresponding photographing result.

In an example, another target object contained in the highlighted sub-image may also be highlighted, such that a highlighted image in which two target objects are highlighted can be obtained.

In another example, low-resolution processing is performed on the multiple highlighted sub-highlights, to obtain low-resolution highlighted images of the target object.

It is understandable that the object type or the composition of the object can also be determined based on the above-mentioned multiple highlighted sub-images. In addition, since the target object has been highlighted, the object type or the composition of the object can be determined accurately.

The disclosure further provides a photographing device. The photographing device is configured to implement the above-mentioned photographing method. As illustrated in FIG. 13, the photographing device includes an acquiring module 101 and a determining module 102.

The acquiring module 101 is configured to acquire multiple sub-images. Each sub-image corresponds to a preset wavelength band. At least two of the preset wavelength bands correspond to a common color channel.

The determining module 102 is configured to determine a photographing result based on the multiple sub-images.

The disclosure further provides a photographing device, which is an improvement of the above-mentioned device. As illustrated in FIG. 13, the determining module 102 is further configured to determine at least one target sub-image corresponding to a target object based on a first control instruction, determine contour information of the target object based on the at least one target sub-image; and determine a highlighted image with a highlighted target object based on the contour information and the multiple sub-images. The target sub-image refers to a sub-image used to determine the contour information of the target object; the contour information refers to information used to determine a contour of the target object; and the highlighted image is the photographing result.

The disclosure further provides a photographing device, which is an improvement of the above-mentioned device. As illustrated in FIG. 13, the determining module 102 is further configured to determine a target pixel region corresponding to the target object based on the first control instruction; and determine the at least one target sub-image based on the target pixel region and multiple sub-images. The target pixel region refers to a region where pixels used to display the target object in the sub-image are located. The target sub-image refers to a sub-image that brightness information of a precent of pixels of the target pixel region is less than or equal to a brightness threshold.

The disclosure further provides a photographing device, which is an improvement of the above-mentioned device. As illustrated in FIG. 13, the determining module 102 is further configured to determine the contour information of the target object based on the brightness information of at least one target sub-image.

The disclosure further provides a photographing device, which is an improvement of the above-mentioned device. As illustrated in FIG. 13, the determining module 102 is further configured to determine an enhancement wavelength band, acquire at least one enhancement sub-image corresponding to the enhancement wavelength band, fuse multiple sub-images to determine a base image, and fuse the at least one enhancement sub-image and the base image to determine an enhanced image. The enhanced image is the photographing result, and the enhanced image refers to an image obtained by enhancing image information corresponding to the enhancement wavelength band of the base image.

The disclosure further provides a photographing device, which is an improvement of the above-mentioned device. As illustrated in FIG. 13, the determining module 102 is further configured to determine a spectral characteristic curve of an object to be identified based on the multiple sub-images; determine an object type of the object to be identified based on the spectral characteristic curve and a first pre-stored mapping table. The object type of the object to be identified is the photographing result, and the first pre-stored mapping table includes a correspondence between the spectral characteristic curves and the object types.

The disclosure further provides a photographing device, which is an improvement of the above-mentioned device. As illustrated in FIG. 13, the determining module 102 is further configured to determine a spectral characteristic curve of an object to be determined based on the multiple sub-images; and determine the component of the object to be determined based on the spectral characteristic curve and a second pre-stored mapping table. The component of the object to be determined is the photographing result. The second pre-stored mapping table includes a correspondence between the spectral characteristic curves and the components.

The disclosure further provides a terminal. The terminal may be a device having a photographing function, such as a mobile phone, a computer, a tablet device, or a television.

As illustrated in FIG. 14, the terminal 400 may include one or more of the following components: a processing component 402, a memory 404, a power supply component 406, a multimedia component 408, an audio component 410, an input/output (I/O) interface 412, a sensor component 414, and communication component 416.

The processing component 402 generally controls the overall operations of the terminal 400, such as operations associated with display, telephone calls, data communications, camera operations, and recording operations. The processing component 402 may include one or more processors 420 to execute instructions to complete all or part of the steps of the foregoing method. In addition, the processing component 402 may include one or more modules to facilitate the interaction between the processing component 402 and other components. For example, the processing component 402 may include a multimedia module to facilitate the interaction between the multimedia component 408 and the processing component 402.

The memory 404 is configured to store various types of data to support the operation of the terminal 400. Examples of these data include instructions for any application or method operating on the terminal 400, contact data, phone book data, messages, pictures, videos, etc. The memory 404 can be implemented by any type of volatile or non-volatile storage device or their combination, such as static random-access memory (SRAM), electrically erasable programmable read-only memory (EEPROM), erasable and programmable read-only memory (EPROM), programmable read-only memory (PROM), read-only memory (ROM), magnetic memory, flash memory, magnetic disk, or optical disk.

The power supply component 406 provides power to various components of the terminal 400. The power supply component 406 may include a power management system, one or more power supplies, and other components associated with the generation, management, and distribution of power for the terminal 400.

The multimedia component 408 includes a screen that provides an output interface between the terminal 400 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor can not only sense the boundary of the touch or slide action, but also detect the duration and pressure related to the touch or slide operation. In some embodiments, the multimedia component 408 includes a front camera and/or a rear camera. When the terminal 400 is in an operation mode, such as a shooting mode or a video mode, the front camera and/or the rear camera can receive external multimedia data. Each front camera and rear camera can be a fixed optical lens system or have focal length and optical zoom capabilities.

The audio component 410 is configured to output and/or input audio signals. For example, the audio component 410 includes a microphone (MIC). When the terminal 400 is in an operation mode, such as a call mode, a recording mode, and a voice recognition mode, the microphone is configured to receive external audio signals. The received audio signal can be further stored in the memory 404 or sent via the communication component 416. In some embodiments, the audio component 410 further includes a speaker for outputting audio signals.

The I/O interface 412 provides an interface between the processing component 402 and a peripheral interface module. The above-mentioned peripheral interface module may be a keyboard, a click wheel, a button, and the like. These buttons may include, but are not limited to: home button, volume button, start button, and lock button.

The sensor component 414 includes one or more sensors for providing the terminal 400 with various status assessments. For example, the sensor component 414 can detect the open/close state of the terminal 400 and the relative positioning of components, such as the display and keypad of the terminal 400. The sensor component 414 can also detect the position change of the terminal 400 or a component of the terminal 400. The presence or absence of contact with the terminal 400, the orientation or acceleration/deceleration of the terminal 400, and the temperature change of the terminal 400. The sensor component 414 may include a proximity sensor configured to detect the presence of nearby objects when there is no physical contact. The sensor component 414 may also include a light sensor, such as a CMOS or CCD image sensor, for use in imaging applications. In some embodiments, the sensor component 414 may also include an acceleration sensor, a gyroscope sensor, a magnetic sensor, a pressure sensor, or a temperature sensor.

The communication component 416 is configured to facilitate wired or wireless communication between the terminal 400 and other terminals. The terminal 400 can access a wireless network based on a communication standard, such as WiFi, 2G, 3G, 4G, 5G or a combination thereof. In an exemplary embodiment, the communication component 416 receives a broadcast signal or broadcast related information from an external broadcast management system via a broadcast channel. In an exemplary embodiment, the communication component 416 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the terminal 400 may be implemented by one or more application specific integrated circuits (ASIC), digital signal processors (DSP), digital signal processing devices (DSPD), programmable logic devices (PLD), field programmable gate array (FPGA), controller, microcontroller, microprocessor, or other electronic components, used to perform the above-mentioned methods.

In an exemplary embodiment, there is also provided a non-transitory computer-readable storage medium including instructions, such as the memory 404 including instructions, and the foregoing instructions may be executed by the processor 420 of the terminal 400 to complete the foregoing method. For example, the non-transitory computer-readable storage medium may be ROM, random access memory (RAM), CD-ROM, magnetic tape, floppy disk, optical data storage device, etc. When the instructions in the storage medium are executed by the processor of the terminal, the terminal is enabled to execute the foregoing method.

Those skilled in the art will easily think of other embodiments of the application after considering the specification and practicing the application herein. This application is intended to cover any variations, uses, or adaptive changes of the application. These variations, uses, or adaptive changes follow the general principles of the application and include common knowledge or conventional technical means in the technical field not disclosed in the application. The description and the embodiments are only regarded as exemplary, and the true scope and spirit of the application are pointed out by the claims.

It should be understood that the application is not limited to the precise structure that has been described above and shown in the drawings, and various modifications and changes can be made without departing from its scope. The scope of the application is only limited by the appended claims.

What is claimed is:

1. A color filter structure of an image sensor comprising:
a plurality of color filter groups, each color filter group including a plurality of color filters wherein,
for each color filter group, the plurality of color filters transmit light of a plurality of preset wavelength bands, and each color filter corresponds to a respective preset wavelength band of the plurality of preset wavelength bands; and
at least two of the preset wavelength bands correspond to a common color channel;
wherein each color filter group includes a plurality of color filter units, each color filter unit transmits light of a respective color channel, each color filter unit includes two or more color filters that transmit light of respective preset wavelength bands of the color channel, and the color channel comprises the respective preset wavelength bands.

2. The color filter structure of claim 1, wherein
for a color filter unit, the at least one color filter contained in the color filter unit transmit light of at least two color channels.

3. The color filter structure of claim 1, wherein for each color channel of a color filter group, the preset wavelength bands corresponding to the color channel are linearly distributed.

4. The color filter structure of claim 1, wherein for each color filter group, the preset wavelength bands are linearly distributed.

5. The color filter structure of claim 1, wherein the common color channel is selected from a group of an infrared color channel, a red color channel, a green color channel, and a blue color channel.

6. An image sensor of claim 1, comprising a color filter structure including a plurality of color filter groups, and each color filter group comprising a plurality of color filters, wherein
for each color filter group, the plurality of color filters transmit light of a plurality of preset wavelength bands, and each color filter corresponds to a respective preset wavelength band; and
at least two of the preset wavelength bands correspond to a common color channel.

7. A photographing method, applied to a terminal comprising an image sensor including a color filter structure of claim 1, the method comprising:
acquiring a plurality of sub-images, each sub-image corresponding to a respective one of preset wavelength bands, and at least two of the preset wavelength bands corresponding to a common color channel; and determining a photographing result based on the plurality of sub-images.

8. The photographing method of claim 7, wherein determining the photographing result based on the plurality of sub-images comprises:
determining at least one target sub-images corresponding to a target object based on a first control instruction, the first control instruction being used to indicate a sub-image for determining contour information of the target object;
determining the contour information of the target object based on the at least one target sub-images, the contour information being information for determining a contour of the target object; and
determining a highlighted image with a highlighted target object based on the contour information and the plurality of sub-images, as the photographing result.

9. The photographing method of claim 8, wherein determining the at least one target sub-images corresponding to the target object based on the first control instruction comprises:
determining a target pixel region corresponding to the target object based on the first control instruction, the target pixel region referring to a region where pixels of the target object in a sub-image is located; and
determining the at least one target sub-images based on the target pixel region and the plurality of sub-images, the target sub-image referring to a sub-image that brightness information of a percent of pixels of the target pixel region of the sub-image is less than or equal to a brightness threshold.

10. The photographing method of claim 8, wherein determining the contour information of the target object based on the at least one target sub-image comprises:
determining the contour information based on brightness information of the at least one target sub-image.

11. The photographing method of claim 8, wherein determining the highlighted image with the highlighted target object based on the contour information and the plurality of sub-images comprises:
determining a base image by fusing the plurality of sub-images; and
determining the highlighted image based on the contour information and the base image.

12. The photographing method of claim 7, wherein determining the photographing result based on the plurality of sub-images comprises:
determining an enhancement wavelength band;
determining at least one enhancement sub-image corresponding to the enhancement wavelength band;
determining a base image by fusing the plurality of sub-images; and
determining an enhanced image by fusing the at least one enhancement sub-image and the base image, as the photographing result, the enhanced image referring to an image obtained by enhancing image information corresponding to the enhancement wavelength band of the base image.

13. The photographing method of claim 7, wherein determining the photographing result based on the plurality of sub-images comprises:
determining a spectral characteristic curve of an object to be identified based on the plurality of sub-images; and
determining an object type of the object to be identified based on the spectral characteristic curve and a first prestored mapping table, as the photographing result, the first prestored mapping table including a correspondence between the spectral characteristic curves and the object types.

14. The photographing method of claim 7, wherein determining the photographing result based on the plurality of sub-images comprises:
determining a spectral characteristic curve of an object to be determined based on the plurality of sub-images; and
determining compositions of the object to be identified based on the spectral characteristic curve and a second prestored mapping table, as the photographing result, the second prestored mapping table including a correspondence between the spectral characteristic curves and the compositions.

15. A terminal, comprising:
an image sensor having a color filter structure;
wherein the color filter structure includes a plurality of color filter groups and each color filter group comprises a plurality of color filters,
for each color filter group, the plurality of color filters transmit light of a plurality of preset wavelength bands, and each color filter corresponds to a respective preset wavelength band; and
at least two of the preset wavelength bands correspond to a common color channel;
wherein each color filter group includes a plurality of color filter units, each color filter unit transmits light of a respective color channel, each color filter unit includes two or more color filters that transmit light of respective preset wavelength bands of the color channel, and the color channel comprises the respective preset wavelength bands.

16. The terminal of claim 15, wherein
for a color filter unit, the at least one color filter contained in the color filter unit transmit light of at least two color channels.

17. The terminal of claim 15, wherein for each color channel of a color filter group, the preset wavelength bands corresponding to the color channel are linearly distributed.

18. The terminal of claim 15, further comprising:
a processor; and
a memory, configured to store instructions executable by the processor;
wherein the processor is configured to:
acquire a plurality of sub-images, each sub-image corresponding to a respective one of preset wavelength bands, and at least two of the preset wavelength bands corresponding to a common color channel; and
determine a photographing result based on the plurality of sub-images.

* * * * *